United States Patent [19]

Kauffman et al.

[11] Patent Number: 4,888,071

[45] Date of Patent: Dec. 19, 1989

[54] METHOD FOR MANUFACTURING RIBBON CABLE AND TRANSPOSED CABLE

[75] Inventors: John C. Kauffman; Richard A. Westenfeld, both of Fort Wayne, Ind.

[73] Assignee: Phelps Dodge Industries, Inc., New York, N.Y.

[21] Appl. No.: 890,099

[22] Filed: Jul. 28, 1986

Related U.S. Application Data

[62] Division of Ser. No. 634,041, Jul. 24, 1984, Pat. No. 4,650,924.

[51] Int. Cl.$^4$ .............................................. H01B 13/06
[52] U.S. Cl. .......................................... 156/50; 156/51; 156/180; 156/204; 156/269; 174/72 TR; 174/117 F; 174/117 FF

[58] Field of Search ................. 29/469.5, 245, 825; 57/212, 213, 215–217, 233; 156/50, 51, 269, 180, 204; 174/34, 113 A, 117 F, 117 FF, 129 R, 129 S; 428/375–378, 397

[56] References Cited

U.S. PATENT DOCUMENTS 4,473,716  9/1984  Jesseman .......................... 156/50 X Primary Examiner—Robert A. Dawson
Attorney, Agent, or Firm—Lundy and Walker

[57] ABSTRACT

Methods and apparatus for manufacturing an improved ribbon cable comprising a plurality of insulated wires juxtaposed in fixed relationship to each other and an improved transposed cable in which each conductor of the cable of the invention is in the form of a continuous helix. The electromagnetic device of the invention has the ribbon cable of the invention as its magnetic windings.

32 Claims, 3 Drawing Sheets

METHOD FOR MANUFACTURING RIBBON CABLE AND TRANSPOSED CABLE

RELATED APPLICATION

This application is a divisional application of Ser. No. 634,041, filed Jul. 24, 1984 and now U.S. Pat. No. 4,650,924.

BACKGROUND OF THE INVENTION

The present invention relates to electrical cable and particularly to ribbon cables in which insulated conductors are juxtaposed, in a fixed relationship to each other, and more particularly, to transposed ribbon cables in which the conductors are in the shape of juxtaposed laterally flattened helices, methods and apparatus for manufacturing the same, and electromagnetic devices having ribbon cable as its magnetic windings.

Electrical cables in a variety of configurations have been available for an extended period of time. One of those varieties is ribbon cable. In ribbon cable, a plurality of conductors are disposed side by side to yield a cable with a roughly rectangular cross section as opposed to the round cross section of ordinary cables. The rectangular cross section permits use of the ribbon cable in applications where one or two dimensions are constrained.

Ribbon cables also provide improved field or armature and stator windings in a number of electromagnetic devices such as motors and generators and transformers. Ribbon cables in many applications provide for increased ease of assembly and improved efficiency. In some electromagnetic devices, eddy current losses can be reduced drastically by use of transposed ribbon cable. In other electromagnetic device, these eddy current losses can be balanced against other losses to produce an electromagnetic device having a greatly improved efficiency.

In transformer design, greater energy efficiency is achieved by using ribbon cable. Load losses can be reduced by using transposed ribbon cable. Similar benefits and similar energy efficiencies can be achieved in rotating electromechanical device design using ribbon cables and transposed ribbon cables.

Further, transposed cables heretofore have been limited as to the number of conductors in the cable. This limitation is the result of conventional methods and apparatus for manufacturing transposed cable. No such limitation exists for the ribbon cable of the invention.

It is therefore highly desirable to provide an improved ribbon cable, an improved ribbon cable that has a flattened generally rectangular cross section, an improved ribbon cable in which insulated conductors are juxtaposed in fixed relation to each other, an improved ribbon cable in which the conductors are at an angle to the longest dimension of the wire cable, an improved transposed ribbon cable, improved methods and apparatus for producing such cables, and an improved electromagnetic device using the ribbon cable of the invention as its magnetic windings.

SUMMARY OF THE INVENTION

It is an object of this invention to provide methods and apparatus for manufacturing an improved ribbon cable.

Another object of the invention is to provide a method and apparatus for producing an improved ribbon cable in which the insulated conductors are juxtaposed in fixed relation to each other.

Another object of the invention is to provide a method and apparatus for producing cables in which the conductors are disposed at an angle to the longitudinal dimension of the cable and define a plurality of juxtaposed laterally flattened helices.

Yet another object of the invention is to provide methods and apparatus for producing cables in which there is no limitation as to the number of conductors.

A further object of the invention to provide methods and apparatus for producing cables which meets all the above desired features.

Still a further object of this invention is to provide improved electromagnetic windings having reduced eddy current losses and/or improved overall energy efficiencies.

Finally, it is an object of the invention to provide an improved electromagnetic device which has the ribbon cable of the invention with one or more of the above desired features as its magnetic windings.

In the broader aspects of the invention there is provided methods and apparatus for manufacturing an improved ribbon cable comprising a plurality of insulated wires juxtaposed in fixed relationship to each other and an improved transposed cable in which each conductor of the cable of the invention is in the form of a continuous helix. The electromagnetic device of the invention has the ribbon cable of the invention as its magnetic windings.

Yet another object of the invention is to provide an improved transposed ribbon cable in which there is no limitation as to the number of conductors and methods and apparatus for producing such cables.

A further object of the invention to provide an improved ribbon cable which meets all the above desired features and methods and apparatus for producing such cables.

Still a further object of this invention is to provide improved electromagnetic windings having reduced eddy current losses and/or improved overall energy efficiencies.

Finally, it is an object of the invention to provide an improved electromagnetic device which has the ribbon cable of the invention with one or more of the above desired features as its magnetic windings.

In the broader aspects of the invention there is provided an improved ribbon cable comprising a plurality of insulated wires juxtaposed in fixed relationship to each other. An improved transposed cable in which each conductor of the cable of the invention is in the form of a continuous helix. An electromagnetic device having the ribbon of the invention as its magnetic windings, and methods and apparatus for manufacturing both the ribbon cable and the transposed cable of the invention.

BRIEF DESCRIPTION OF THE DRAWINGS

The above mentioned and other features and objects of this invention and the manner of obtaining them will become more apparent and the invention itself will be better understood by reference to the following description of an embodiment of the invention taken in conjunction with the accompanying drawing wherein.

DESCRIPTION OF A SPECIFIC EMBODIMENT

Figure 1:
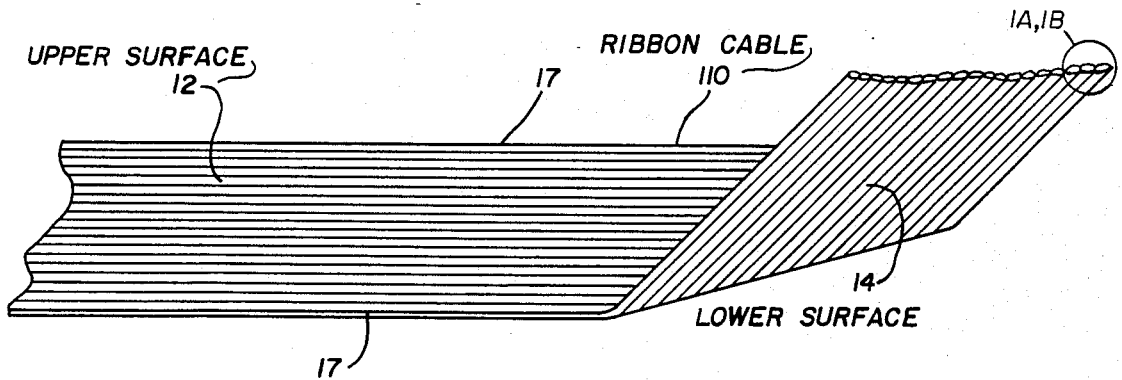
FIG. 1 is a perspective view of the longitudinal ribbon cable of the invention.

The ribbon cable 110 is shown in FIG. 1 to comprise a plurality of juxtaposed conductors 18 having superimposed thereon a flexible, continuous, and concentric coat of insulating material 19 and are held in fixed relationship to each other by a bonding material 20. In a specific embodiment, bonding material 20 has sufficient insulating properties for the requirements of a particular use and functions as the base insulation for conductors 18. In an alternative specific embodiment, ribbon cable 110 would include a continuous and concentric coat of flexible bonding material 21 superimposed on insulating coat 19.

Ribbon cable 110 of the invention has a generally rectangular cross section with an upper surface 12, a lower surface 14 and two edges 17. Upper surface 12 and the lower surface 14 are generally parallel and roughly planar to each other with deviations from that shape generally due to the cross sectional shape of the conductors 18. In a specific embodiment, rectangular cross section conductors 18 are used and the planarity of the surfaces 12, 14 is better that than shown in FIG. 1.

Figure 3:
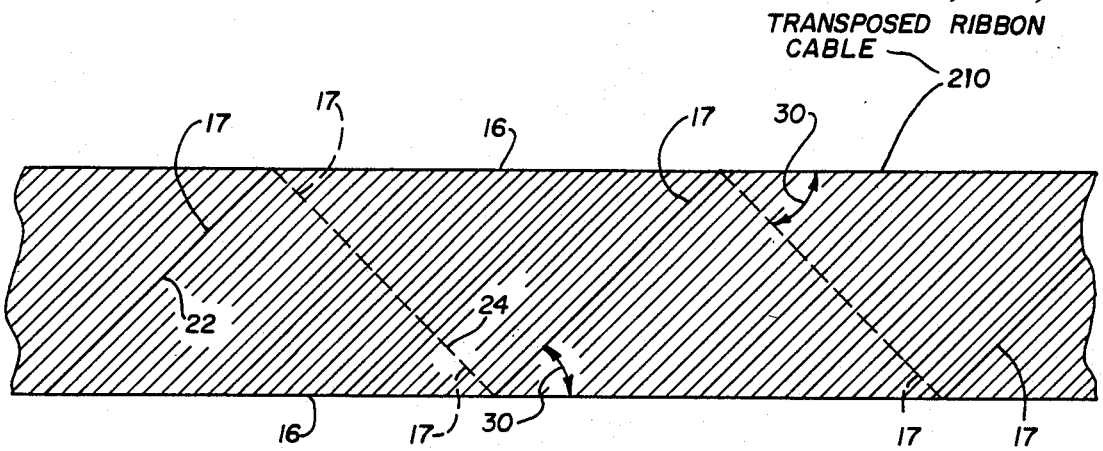
FIG. 3 is a top plan view of the ribbon cable of the invention in which a single wire of the embodiment of FIG. 2 is emphasized for clarity.
Figure 2:
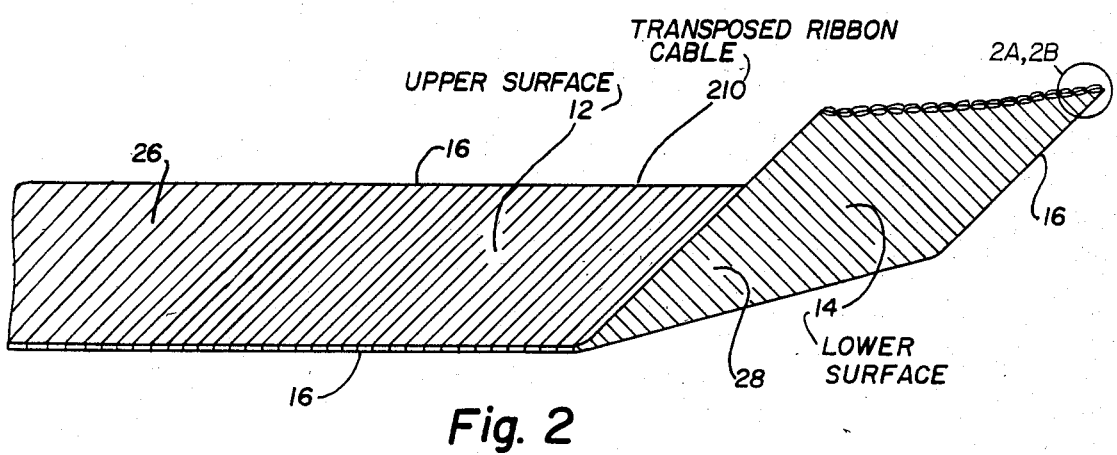
FIG. 2 is a perspective view of the transposed ribbon cable of the invention.

In the transposed ribbon cable 210 of the invention, conductors 18 are all in the shape of laterally flattened helicies with upper segments 22 and lower segments 24 being coplanar with each other at an oblique angle to the longest dimension of the cable 210 as shown in FIGS. 2 and 3. The upper and lower segments 22, 24 of each conductor 18 are sequentially transposed throughout the length of the cable 210 and conductors 18 are generally coplanar and generally parallel to the longest dimension and longitudinal axis of the ribbon cable 110.

This relationship may be described mathematically by the following formulas in which "a" equals the acute angle 30 between the upper and lower segments 22, 24 of the helicies and the longest dimension of the transposed ribbon cable 210, "N" equals the number of conductors 18 in the transposed ribbon cable 110, "d" equals the nominal outside diameter of conductors 18, "W" equals the cable width of the transposed ribbon cable 210 perpendicular to its longest dimension, "P" equals the pitch of the transposed ribbon cable 210, i.e. the distance between successive upper segments 22 or lower segments 24 of conductor 18 in a direction parallel to the longest dimension of the transposed ribbon cable 210. "CL" equals the length of the transposed ribbon cable 210, and "SL" equals the strand length or the length of a conductor 18 in a transposed ribbon cable 210 of length "CL":

$$\text{CABLE WIDTH} = \frac{N(\text{Nom. } OD)}{2 \sin(90-a)}$$

$$\text{STRAND WIDTH} = \frac{L}{\sin(90-a)}$$

$$\text{FOLDING ANGLE} = \frac{-1\, N(\text{Nom. } OD)}{2W}$$

$$\text{PITCH (advance of cable per machine revolution)} = \frac{W}{\sin a}$$

Angle 30 in all embodiments ranges from slightly greater than 0 to slightly less than 90 degrees.

In the transposed ribbon cable 210 of the invention of FIGS. 2 and 3, the upper and lower segments 22, 24 define upper and lower layers 26 and 28, respectively. Upper layer 26 and the lower layer 28 are bonded together by bonding material 32. In a specific embodiment, bonding material 32 may be the same as bonding material 20. Conductors 18 in the upper segments 22 and the lower segments 24 of the transposed ribbon cable 210 are angularly disposed to the longest dimension of the cable 210 and at an adjacent angle to the segments of the opposite layer 22 or 24.

In a specific embodiment of the transposed ribbon cable 210 of the invention as shown in FIGS. 2 and 3, 600 conductors 18 of 0.020 inch bare copper are used, each conductor 18 has superimposed thereon a polyvinyl formal enamel coating and is bonded to adjacent conductors 18 with a polyvinyl butyral enamel. The 300 upper segments 22 together with their bonding material 20 form the upper layer 26 and the 300 lower segments 24 together with their bonding material 20 form the lower layer 28. Layers 26 and 28 are bonded together with their bonding material 32.

In other embodiments, the number of conductors 18 may vary from a few to several thousand. An unlimited number of conductors 18 may be positioned in one or more ribbons of generally coplanar conductors 18 as shown in FIG. 1 and bonded together to be used as ribbon cable 110 or folded as illustrated in FIG. 2 and used as transposed ribbon cable 210.

One method of the invention for making the transposed ribbon cable 210 of the invention comprises the steps of insulating one or more conductors 18 using conventional magnet wire enamel solution coating methods or the methods generally disclosed in U.S. Pat. No. 4391848, wrapping one or more conductors 18 obliquely around a laterally flattened mandrel 34 at a chosen constant angle to achieve the desired pitch and removing those conductors from the mandrel 34 as the conductors 18 are wrapped to form a plurality of juxtaposed laterally flattened helices having upper segments 22 and lower segments 24, applying bonding agent 36 between helices and the upper and lower segments 22, 24, as segments 22, 24 are being formed or after segments 22, 24 are formed by impregnation techniques, and severing the ribbon cable formed thereby at opposite ends to expose a plurality of conductor ends.

In a specific embodiment, the bonding agent 36 may be, for example, a bonding material 32 or an activator (such as heat or a solvent) of a B-stage bonding material 20 or 32 previously applied to the conductors 18.

In some of the cable configurations of the invention, the insulated conductors 18 are magnet wire and are in accordance with ANSI/NEMA MW-1000 Standards.

In some of the cable configurations of the invention, less build and lower dielectric values than required by the ANSI/NEMA MW1000 Standards are acceptable. The lower limits of build and dielectric value are determined by the anticipated turn to turn voltage differentials of the specific contemplated application.

The wrapped conductors 18 are then compressed both in a directions transverse of the cable 210 in which the upper segments 22 and lower segments 24 are compressed together and at right angles thereto axially of cable 210 so as to form a plurality of juxtaposed laterally flattened helices. The edges 16 of the transposed ribbon cable 210 of the invention may be then rolled to result in a compact generally rectangular cross-sectional cable with a roughly planar upper layer 26, a roughly planar lower layer 28 and two edges 16. This results in a compact generally rectangular cross-sectional shape with a roughly planar upper layer 26, a roughly planar lower layer 28 and two edges 16.

In a specific embodiment, the compressing step is performed simultaneously with the wrapping and removing steps by differentially transporting conductors 18 in the direction of transport as the wrapping, removing and bonding steps are performed.

The resulting cable is an integral cable with the conductors bonded together with the bonding material surrounding each conductor and defining with the conductors the boundaries of the cable. The ribbon cable 210 can be wrapped with exterior insulation material either spirally or longitudinally and spooled for shipping as desired.

In all embodiments of the method above described, the source of the conductors 18 for the wrapping step are a plurality of wire spools mounted for rotation on a plurality of spindles. To achieve the wrapping step, either the spools must be rotated around the mandrel 34, or the mandrel 34 must be rotated around the spools. The number of conductors used in the method may determine the apparatus used in performing the method and the number of steps performed at a single work station.

In another method of the invention for producing transposed ribbon cable 210, the insulated conductors 18 are first formed into the longitudinal ribbon cable 110 of FIG. 1. The method of making the ribbon cable 110 includes the step of insulating a plurality of conductors 18 using conventional magnet wire in enamel coating methods or those methods disclosed wrapping or U.S. Pat. No. 4391848, paying out as many insulated conductors 18 as are required, simultaneously, and guiding the conductors into the form of a ribbon 38 wherein the longitudinal axis of each conductor is parallel to the axes of the others and define a single plane, and the exterior surfaces of each conductor are contiguous to adjacent conductors.

The conductors 18 are then bonded together to form the cable 110. The bonding step can be performed either by utilizing a B-stage bonding material superimposed on the insulated conductors 18 subsequently to the insulating step and then performing the bonding step by activating the bonding material during the bonding step. Alternatively, bonding material may be applied to the contiguous and parallel conductors of the ribbon 38 during the bonding step and after the performance of the guiding step. Preferably, care should be taken to impregnate or fill all of the intersticies between the conductors 18. This can be achieved by utilizing modified vacuum impregnation techniques or pressurized bonding techniques, if desired.

The bonding step continues by wiping the excess of the bonding material from the ribbon and hardening the bonding material so as to form cable 110. During the wiping and hardening steps, the respective conductors 18 are maintained in the same position as aforedescribed in the guiding step and the upper surface 12, the lower surface 14 and the two edges 17 are formed.

In a specific embodiment, conductors 18 may be insulated and formed together as a ribbon 38 and bonded together with a bonding material extruded onto the conductors by transporting the conductors through a heated die with an opening slightly larger than the dimensions of the ribbon, and quenched.

In manufacturing transposed ribbon cable 210, the ribbon cable 110 is folded over itself, repeatedly, to produce ribbon cable 210 as shown in FIGS. 2 and 3. The folding of the cable 110 to form the transposed cable 210 forms each of the conductors of the cable into a plurality of juxtaposed laterally flattened helices having upper segments 22 and lower segments 24. Each fold positions the conductors 18 of the folded portion angularly with respect to the conductors of the preceding portion and with the axis of the finished cable 210.

The folding step comprises the steps of paying out the ribbon 110 at an angle to the desired axis of the transposed ribbon cable 210 a measured amount, folding the ribbon cable 110 against a first straight edge of a flat folding mandrel rotating the folded cable in the direction of the fold and folding the ribbon cable 110 about a second straight edge of the folding mandrel. The first and second straight edges of the mandrel are parallel to each other, and spaced from each other the desired cable width. Paying out cable 110 a second measured amount to move the second fold so as to be coincident with the first straight edge of the mandrel, and folding the cable 110 a third time. Cable 110 is repeatedly paid out and folded in this manner.

Simultaneously with the folding step, bonding material 32 may be positioned between the folded portions. Subsequently thereto, the folded portions may be compressed and bonded together to form the bonded transposed ribbon cable 210. Again the bonding step, in specific embodiments, may include the aforementioned application of solvent or heat, or the use of vacuum or pressure impregnating techniques or B-stage bonding materials. The transposed ribbon cable formed by this method may then be wrapped with exterior insulation material, either spirally or longitudinally, and spooled for shipment.

In all of the aforementioned folding and wrapping steps, the folding and wrapping stations may be stationary and the insulated conductor 18 and cable 110 payoff reels rotated around the folding mandrel; or in the alternative, the folding and wrapping stations may be rotated about pay-off reels from which ribbon cable 110 or conductors 18 are supplied to the folding or wrapping stations as afore-described. The specific apparatus used in the performance of the method of the invention will be described in more detail hereinafter.

Depending upon the bonding material utilized, ovens, heated dies or the like may be used in the bonding step. Conventional bonding materials may either be thermoplastic and thereby softened and made flowable by the application of heat or may be softened by the application of solvents later to be driven off by the application of heat. Whenever heat is utilized in the bonding steps afore-described, a water quench or air cooling may be necessary.

Figure 4:
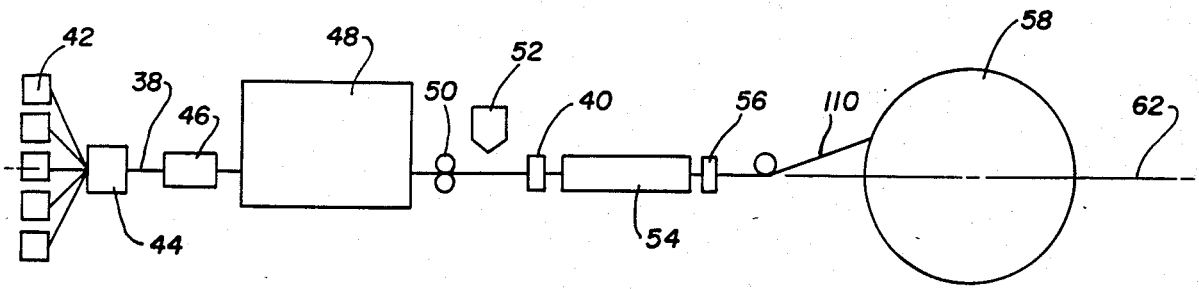
FIG. 4 is a schematic diagram of a portion of the apparatus of the invention for the production of the ribbon cables of FIGS. 1, 2 and 3.
Figure 5:
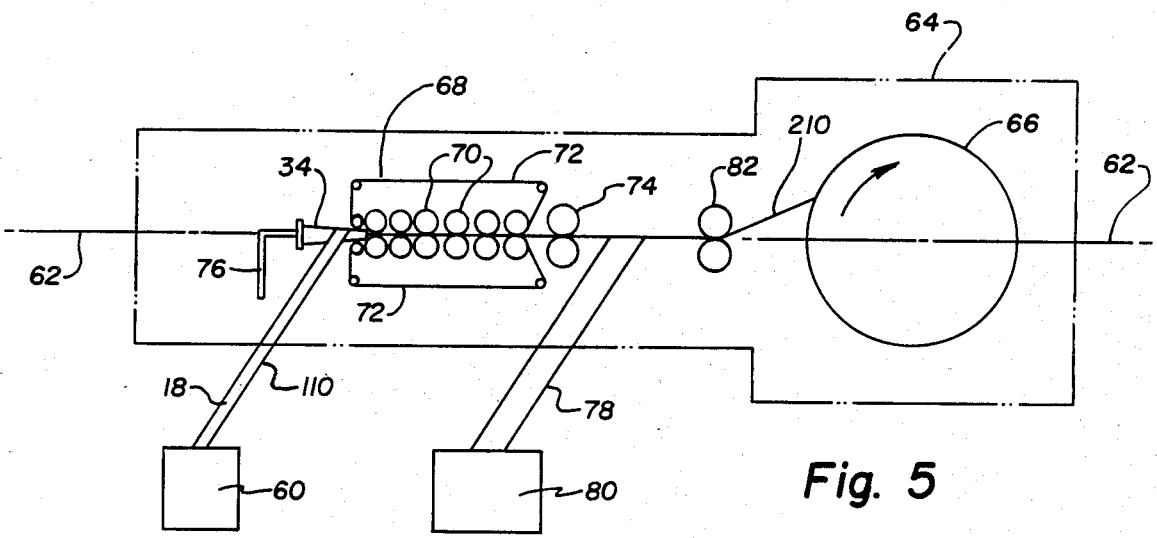
FIG. 5 is a schematic diagram of the remaining portion of the apparatus of the invention.
Figure 6:
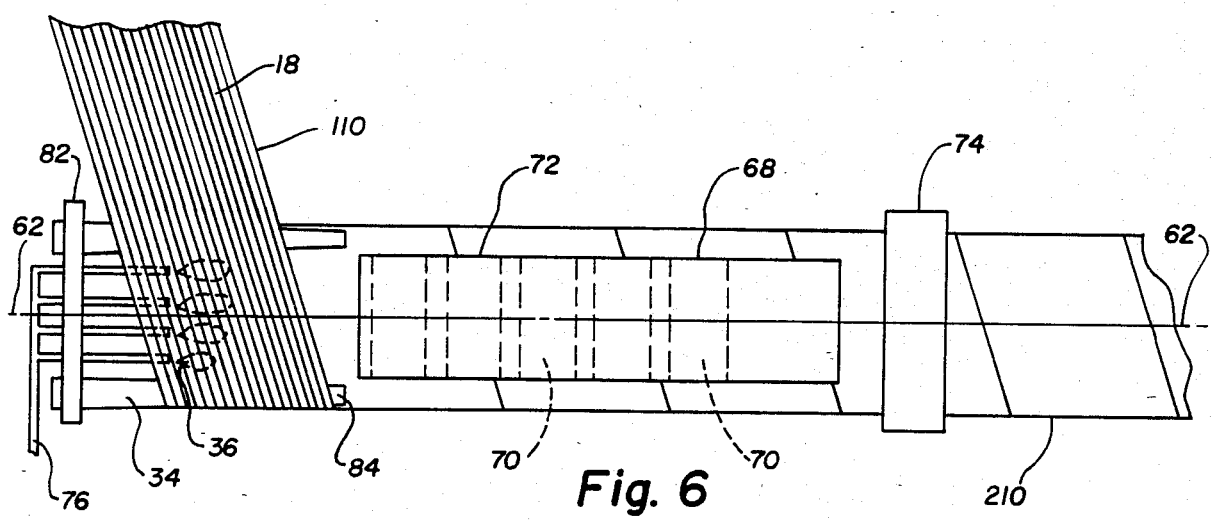
FIG. 6 is a schematic diagram of part of the apparatus of FIG. 5.

The apparatus of the invention is illustrated in FIGS. 4 through 6. In making the cable 110, the conductors are first insulated as above-described, and may be spooled for handling. B-stage bonding materials may be superposed on the insulated conductors if desired in accordance with the afore-described insulating methods. Conductors 18 are transported then from conductor supplies or spools 42 or directly through a guide 44 to form the conductors into a ribbon 38 of parallel coplanar wires. Suitable bonding material 20 may be applied to the ribbon 38 by the applicator 46. The applicator 46 may take several forms in different specific embodiments. The applicator 46 in all embodiments must hold the conductors 18 in the form of ribbon 38 throughout the bonding step and until the bonding material is hardened and the ribbon 38 is bonded together as in a single piece. In specific embodiments, the applicator 46 may be a heated extrusion die in which the die opening is geometrically similar and only slightly different from the desired cross-sectional dimensions of the cable 110. In accordance with conventional extrusion technology, the die opening may be either larger or smaller than the desired dimensions of the cable 110.

In another specific embodiment, the applicator 46 may be a heated channel also having a channel opening with a cross-sectional shape geometrically similar but slightly larger than the desired dimensions of the cable 110. In this embodiment, the channel merely holds the ribbon 38 of parallel co-planar wires in the shape desired and forms the exterior dimensions of the cable 110 when the bonding material hardens.

In other specific embodiments, the parallel co-planar conductors 18 may be held in the form of ribbon 38 by oppositely disposed side portions and the opposite edges 17 of the ribbon 110 are formed by the continual wiping of the ribbon on the oppositely disposed side portions, whereas the upper surface 12 and the lower surface 14 are formed by wipers which continually wipe the excess bonding material from the ribbon 38.

Bonding material 20 is activated by passing the ribbon through an oven 48, or alternatively by exposing the bonding material 20 to a solvent therefore. The bonding material is softened into a flowable form in both embodiments, and in both embodiments oven 48 is required. Oven 48 softens the bonding material 20 in the former case, and drives off the solvent in the later case. Heat may also be used to assist a solvent in softening bonding material 20. In all cases, oven 48 may additionally cure either the insulation or bonding material, or both.

The bonded ribbon cable 110 is then transported through pressure rollers 50. In the specific embodiment illustrated, additional bonding material 20 is applied to the ribbon cable 110 by means of extruder 52 and ribbon cable 110 is transported through a heated die 40 and a quenching unit 54. Thus two specific embodiments of the apparatus of applying bonding material 20 to the ribbon 38 are shown. In other specific embodiments, only a single embodiment or a combination of the two different embodiments may be used. The excess bonding material is removed by a pressurized air at air wipe 56.

The finished longitudinal ribbon cable 110 is either wound onto a take up reel 58 which also provides the motive power for the transportation or is input into the remaining portion of the apparatus by which the transposed ribbon cable 210 of the invention is manufactured. This remaining portion of the apparatus of the invention for the production of tranposed ribbon cable 210 is illustrated in FIG. 5 and 6.

Referring to FIGS. 5 and 6, a wire supply 60 delivers either the ribbon cable 110 or one or more conductors 18, as the case may be, to a folding mandrel 34 to form a plurality of laterally flattened continuous helices defined by each conductor 18. The wrapping is performed by changing the relative position of the mandrel 34 and the wire supply 60 in a rotation about the axis 62 and folding the conductors 18 or cable 110 about the outer straight edges of mandrel 34. The ribbon cable 110 may be the ribbon cable 110 disclosed herein or the ribbon cable disclosed in U.S. patent application Ser. No. 634,040 entitled "Ribbon Cable" by John C. Kauffman filed Jul. 24, 1984 now U.S. Pat. No. 4,692,566 and U.S. patent application Ser. No. 634,042 entitled "A Ribbon Cable, A Transposed Ribbon Cable And A Method And Apparatus For Manufacturing Transposed Ribbon Cable" by Jessie H. Coon filed Jul. 24, 1984, now U.S. Pat. No. 4,658,090, both of which are assigned to Phelps Dodge Industries, Inc. and are incorporated herein by reference. The relative rotation of the wire supply 60 around the axis 62 and the mandrel 34 may be achieved by either rotating the wire supply 60 around the axis 62 and maintaining the mandrel 34 stationary or by rotating mandrel assembly 64 about the axis 62 and maintaining the wire supply 60 stationary. Conventional machine elements may be used to provide these motions.

The conductor supply 60 at all times pays out conductor 18 or cable 110 at an oblique angle to the axis 62 of the mandrel 34 as the relative movement occurs. That angle 30 determines the ratio of the cable width to the cable pitch. As the cable 210 is wrapped, bonding agent applicator 76 applies bonding material 20 between the layers 26, 28, as desired. The mandrel 34 is longitudinally tapered in the direction of cable movement as indicated by the arrow in FIGS. 5 and 6. This tapering of mandrel 34 allows the cable 110 and conductors 18 to be properly folded and the folded cable 210 to be easily removed from mandrel 34.

In one embodiment, the lateral dimension of mandrel 34 can be selectively varied. This permits transposed ribbon cable 210 of different cable widths to be produced on the same mandrel 34. In that embodiment, mandrel 34 has a central member 82 perpendicular to the axis 62 and two spaced members 84 adjustably joined to central member 82 at a variety of equidistant points away from the axis 62. Members 84 either have slightly tapered outer edges or are secured to central member 82 at an angle to provide the desired taper.

The apparatus of the specific embodiment illustrated uses a caterpillar 68 to both move and compress the wrapped cable 210 after cable 210 is moved off the mandrel 34. Caterpillar 68 comprises a series of opposed rollers 70 interconnected on each side by belts 72 through which cable 210 is fed. The opposed rollers 70 are spaced apart at a distance required to compress the cable 210. In a specific embodiment, the rollers 70 are arranged in order of increasing diameter along the direction of travel of cable 210 and all of the rollers 70 on one side of cable 210 are rotated simultaneously by the movement of cable 210. The differential of the sizes of the rollers 70 causes the movement of cable 210 to be slowed as the cable 210 proceeds in the direction of travel. This causes the conductors 18 of cable 210 to simultaneously bunch up and to compress both in the direction of transport and in directions perpendicular to the direction of transport.

The speed of movement of cable 210 relative to the wrapping of the cable 110 or conductors 18 around mandrel 34 determines the pitch of the transposed ribbon cable 210 produced. The edges 16 of the wrapped wires 18 are then formed by rollers 74.

The finished cable 210 can then be wrapped with insulating material 78 delivered by material supply 80, if desired. The wrapping shown is spiral wrapping. Longitudinal wrapping as disclosed in U.S. Pat. No. 3,842,192 may be preferred in some applications. Rollers 82 secure the insulating material, and may be heated if desired. The finished transposed cable 210 is transported onto a take up reel 66 for shipping.

Bonding materials 20 and 32 have been disclosed hereinabove to be activated by the application of heat, or by the application of solvents, or both. In the apparatus illustrated in FIGS. 5 and 6, heat is applied by preheating the bonding material prior to application, heating the mandrel 34, or heating the rollers 70 and 82. Alternatively, an oven and a quench, such as oven 48 and quench 54, can be positioned on opposite sides of the caterpillar 68 and rollers 74. Sufficient solvent usually can be applied with the bonding material by applicator 76 to reactivate any bonding material on the conductors 18 or the cable 110. Additional solvent, however, can be supplied as desired.

In other specific embodiments, an essentially continuous and concentric coat of flexible bonding material is superimposed on the coat of insulating material 19 by the same methods as above disclosed.

Generally, no additional bonding material need be applied to adhere the wrapped insulating material 78 to the cable 210. Generally, the wrapping of insulating material 78 occurs while the bonding material is still activated and the bonding material adheres the wrapping 78 to the conductor 210. However, additional activation may be supplied by applying heat or solvent, as desired, prior to the rollers 82.

In specific embodiments of the invention, conductors 18 may be either copper or aluminum conductors.

Figure 7:
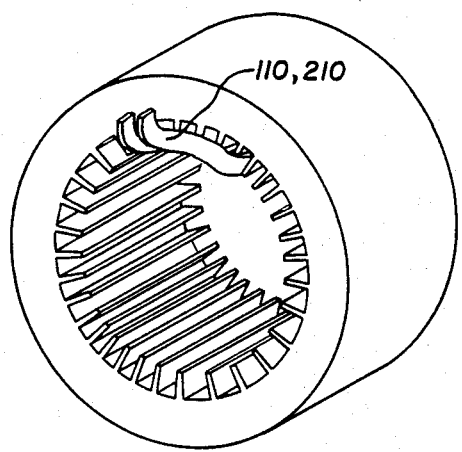
FIG. 7 is a perspective view of an armature having the ribbon cable of the invention as its magnetic windings.
Figure 8:
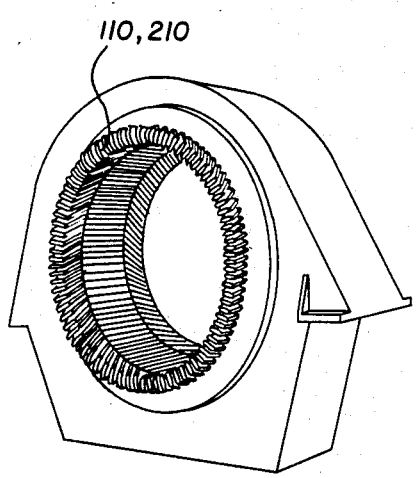
FIG. 8 is a perspective view of a stator having the ribbon cable of the invention as its magnetic windings.

Referring now to FIGS. 7 and 8, specific embodiments of the improved electromagnetic devices of the invention is shown. Shown in FIG. 8 is an armature having as its magnetic windings the ribbon cable 110 or 210. FIG. 9 shows a stator having as its magnetic windings the ribbon cable 110 or 210 as its magnetic windings. In both instances, the improved electromagnetic devices have improved windings in which energy losses are greatly reduced. Both the armature and stator as afore-described result in an improved electromagnetic device having a greatly improved efficiency.

While a specific embodiment of the invention has been shown and described herein for purposes of illustration, it is desired that the protection afforded by any patent which may issue upon this application not be limited strictly to the disclosed embodiment; but that it extend to all structures and arrangements and methods and articles which contain the essence of the invention and which fall within the scope of the claims which are appended herein.

What is claimed is:

1. A method of making ribbon cable comprising the steps of: providing one or more elongated conductors, superimposing on each of said conductors a relatively thin, flexible and generally continuous and concentric coating of insulating material, wrapping each of said conductors obliquely around an elongated mandrel of sheet material having opposed spaced apart edges and generally flat and parallel surfaces to form each conductor into a helix, said conductors defining an angle with the axis of said mandrel, compressing said helices together axially of said mandrel, said helices being side by side, flattening said helices transversely of said mandrel axis and generally perpendicularly of said mandrel surfaces, bonding said helices together in the compressed and flattened state thereof, thereby forming an integral ribbon of juxtaposed laterally flattened helices, and severing said ribbon at opposite ends transversely of said mandrel axis thereby to expose a plurality of conductor ends.

2. The method of claim 1 wherein each of said conductors forming said helices has upper segments and lower segments, said upper segments being oblique to the longest dimension of said ribbon and at adjacent angles to said lower segments of said conductors, and said lower segments of said conductors are oblique to said longest dimension of said ribbon and at adjacent angles to said upper segments of said conductors.

3. The method of claim 1 wherein said ribbon comprises a plurality of conductors, the width of said ribbon and the direction of said flattening is essentially equal to the number of conductors in said plurality multiplied by the outside diameter of said conductors and divided by twice the cosine of the acute angle between said conductors of said laterally flattened helices and the longitudinal axis of said ribbon.

4. A method of making ribbon cable comprising: providing a plurality of elongated first conductors, superimposing on each of said first conductors a relatively thin, flexible and generally continuous and concentric coating of insulating material, placing said first conductors side by side with the axis of said first conductors extending parallel to each other and defining a common plane with the insulating coating of adjacent conductors being contiguous, providing a plurality of elongated second conductors, superimposing on each of said second conductors a relatively thin, flexible and generally continuous and concentric coating of insulating material, placing said second conductors side by side with the axis of said second conductors extending parallel to each other and defining a common plane with the insulating coating of adjacent conductors being contiguous, placing said first conductors and second conductors side by side, bonding said first conductors together and bonding said second conductors together to form an integral ribbon cable having generally straight longitudinal boundaries, generally flat upper and lower surfaces and a generally rectangular cross section essentially, defined by said first and second conductors.

5. The method of claims 1 further comprising: folding said ribbon cable against a first straight edge defining a first fold, said first fold being angularly disposed to the axis of said conductors, said axis of said ribbon cable before and after said first fold defining an angle between 0° and 90° with the axis of said cable, paying out an amount of said ribbon cable equal to the width of said ribbon cable divided by the sine of said angle, folding said ribbon cable against a second straight edge defining a second fold, said second fold being angularly disposed to the axis of said conductors, said axis of said ribbon cable before and after said second fold defining the same angle as before and after said first fold, positioning said folds to define the longitudinal boundaries of a folded ribbon cable, and repeating said paying out and said second folding and said positioning steps over and over again until a desired length of cable is formed, said straight edges being parallel and spaced apart a distance equal to the desired width of the cable, and severing said folded cable at opposite ends transversely thereof to expose a plurality of conductors.

6. A method of making ribbon cable comprising: providing a plurality of elongated conductors, superimposing on each of said conductors a relatively thin, flexible and generally continuous and concentric coating of insulating material, placing said conductors side by side with the axis of said conductors extending parallel to each other and defining a common plane with the insulating coating of adjacent conductors being contiguous, bonding said conductors together to form an integral ribbon cable having generally straight longitudinal boundaries, generally flat upper and lower surfaces and a generally rectangular cross section essentally defined by said conductors, folding said ribbon cable against a first straight edge defining a first fold, said first fold being angularly disposed to the axis of said conductors, said axis of said ribbon cable before and after said first fold defining an angle between 0° and 90° with the axis of said cable, paying out an amount of said ribbon cable equal to the width of said ribbon cable divided by the sine of said angle, folding said ribbon cable against a second straight edge defining a second fold, said second fold being angularly disposed to the axis of said conductors, said axis of said ribbon cable before and after said first fold, positioning said folds to define the longitudinal boundaries of a folded ribbon cable, and repeating said paying out and said second folding and said positioning steps over and over again until a desired length of cable is formed, said straight edges being parallel and spaced apart a distance equal to the desired width of the cable, and severing said folded cable at opposite ends transversely thereof to expose a plurality of conductors.

7. The method of claims 1, 4, 5 or 6 wherein said conductor layers are bonded together.

8. The method of claims 1, 4, 5 or 6 wherein said coating of insulation material is in accordance with ANSI/NEMA MW1000 Standards excepting the dimensional and dielectric standards, said dimensional and dielectric standards being equal to ANSI/NEMA MW1000 Standards or less.

9. The method of claims 1, 4, 5 or 6 wherein said conductors are chosen from the group consisting of aluminum and copper conductors.

10. The method of claims 1, 4, 5 or 6 wherein said conductors are provided in a number greater than thirty-one.

11. The method of claims 1, 4, 5 or 6 further comprising the step of superimposing an essentially continuous and concentric coating of flexible bonding material on said coating of insulating material.

12. The method of claims 1, 4, 5 or 6 further comprising the steps of placing bonding material in the interstices between said conductors, said bonding material generally defining the exterior configuration of said ribbon cable with said conductors.

13. The method of claims 1, 4, 5 or 6 wherein said conductors are chosen from the group consisting of aluminum and copper conductors, and said bonding material is the same material as said insulation material.

14. The method of claims 1, 4, 5 or 6 wherein said conductors are provided in a number greater than thirty-one and said bonding material is the same material as said insulation material.

15. The method of claims 1, 4, 5 or 6 wherein said conductors are chosen from the group consisting of aluminum and copper conductors and said bonding material is softenable by the application of heat.

16. The method of claims 1, 4, 5 or 6 wherein said conductors are chosen from the group consisting of aluminum and copper conductors, and said bonding material is softenable by the application of solvent.

17. The method of claims 1, 4, 5 or 6 wherein said conductors are provided in a number greater than thirty-one and said bonding material is softenable by the application of heat.

18. The method of claims 1, 4, 5 or 6 wherein said conductors are provided in a number greater than thirty-one and said bonding material is softenable by the application of solvent.

19. The method of claims 1, 4, 5 or 6 further comprising the step of wrapping said ribbon with an elongated sheet of exterior insulation material and spooling the same for shipping, storage or handling.

20. The method of claims 1, 4, 5 or 6 further comprising the step of wrapping said ribbon with an elongated sheet of exterior insulation material, and spooling the same for shipping, storage or handling, and wherein said ribbon is spirally wrapped with said exterior insulation material.

21. The method of claims 1, 4, 5 or 6 further comprising the step of wrapping said ribbon with an elongated sheet of exterior insulation material, and spooling the same for shipping, storage or handling, and wherein said ribbon is longitudinally wrapped with said exterior insulation material.

22. The method of claim 1 wherein said compressing and flattening steps are accomplished simultaneously.

23. The method of claim 22 wherein said compressing and flattening steps are accomplished by differentially transporting said conductors to compress said wires together in their direction of transport and simultaneously flattening said helices transversely of said mandrel axis and generally perpendicularly of said mandrel surfaces.

24. The method of claim 1 wherein said compressed and flattened and bonded helices define longitudinally extending ribbon cable boundaries, said boundaries being rolled to define the exterior edges of said ribbon cable.

25. The method of claim 5 wherein said folding steps are accomplished about a mandrel, said mandrel having two opposite straight edges, the distance between said edges being greater than the transverse dimension of said edges.

26. The method of claim 6 wherein said folding steps are accomplished about a mandrel, said mandrel having two opposite straight edges, the distance between said edges being greater than the transverse dimension of said edges.

27. The method of claim 5 or 6 wherein said mandrel is rotated as said folding steps are accomplished.

28. The method of claim 5 or 6 wherein said ribbon cable is rotated as said folding steps are accomplished.

29. The method of claims 1, 25 or 26 wherein the lateral dimension of said mandrel is about equal to the number of conductors in said plurality multiplied by the outside diameter of said conductors divided by twice the cosine of the acute angle between said conductor axes and the longitudinal axis of said cable.

30. The method of claim 4 wherein said first and second conductors define two or more layers of conductors superimposed on each other.

31. The method of claim 30 wherein each of said layers is insulated from the other layers.

32. The method of claim 30 wherein the axis of said conductors of each of said layers is angularly disposed with the axis of said conductors of adjacent layers.

* * * * *